Sept. 28, 1954   R. L. ERWIN   2,690,108
DELAYED ACTION INDEPENDENT CULTIVATOR GANG LIFTING DEVICE
Filed July 7, 1950   4 Sheets-Sheet 3
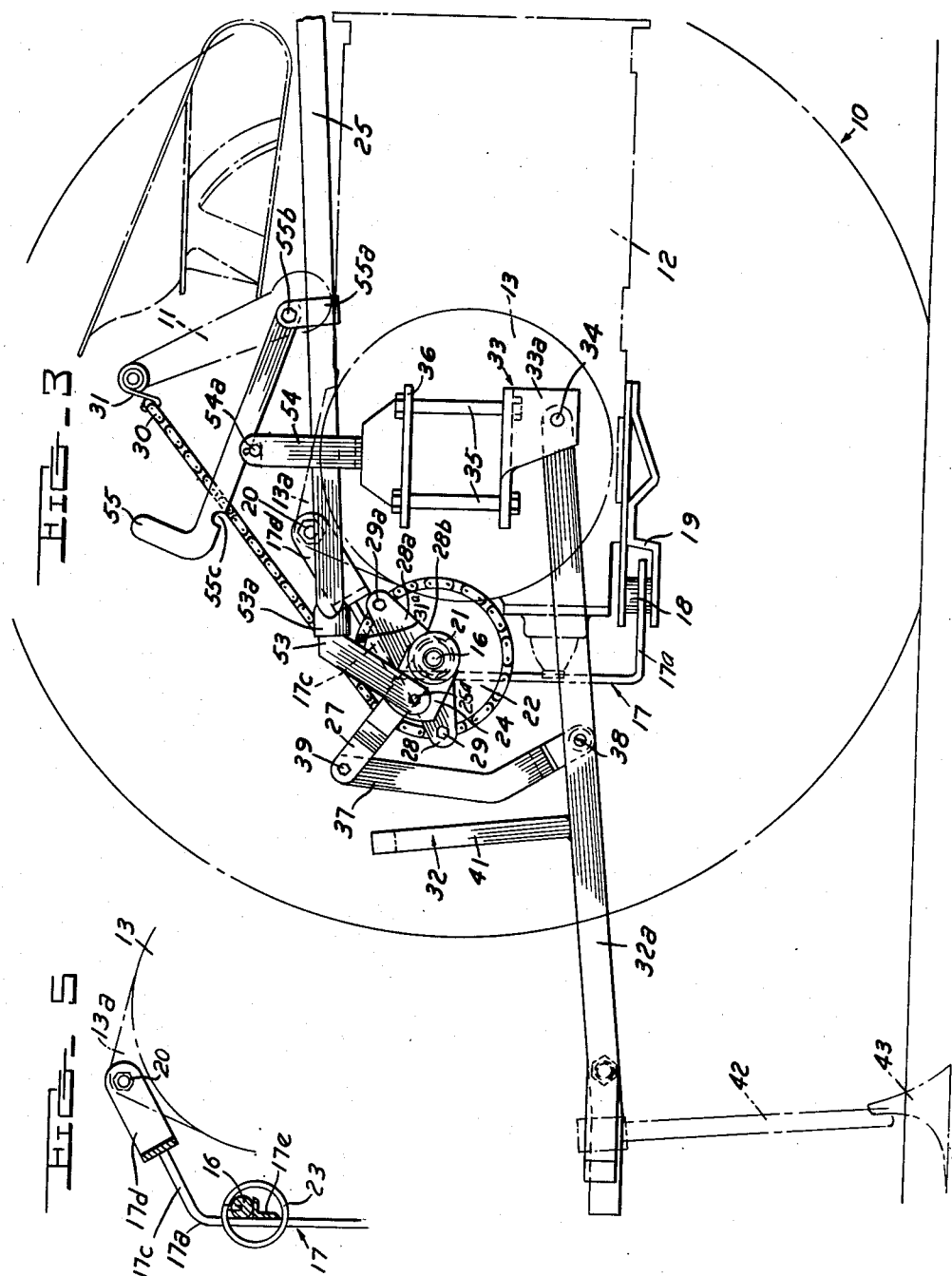
INVENTOR.
ROBERT L. ERWIN
BY
ATTORNEY

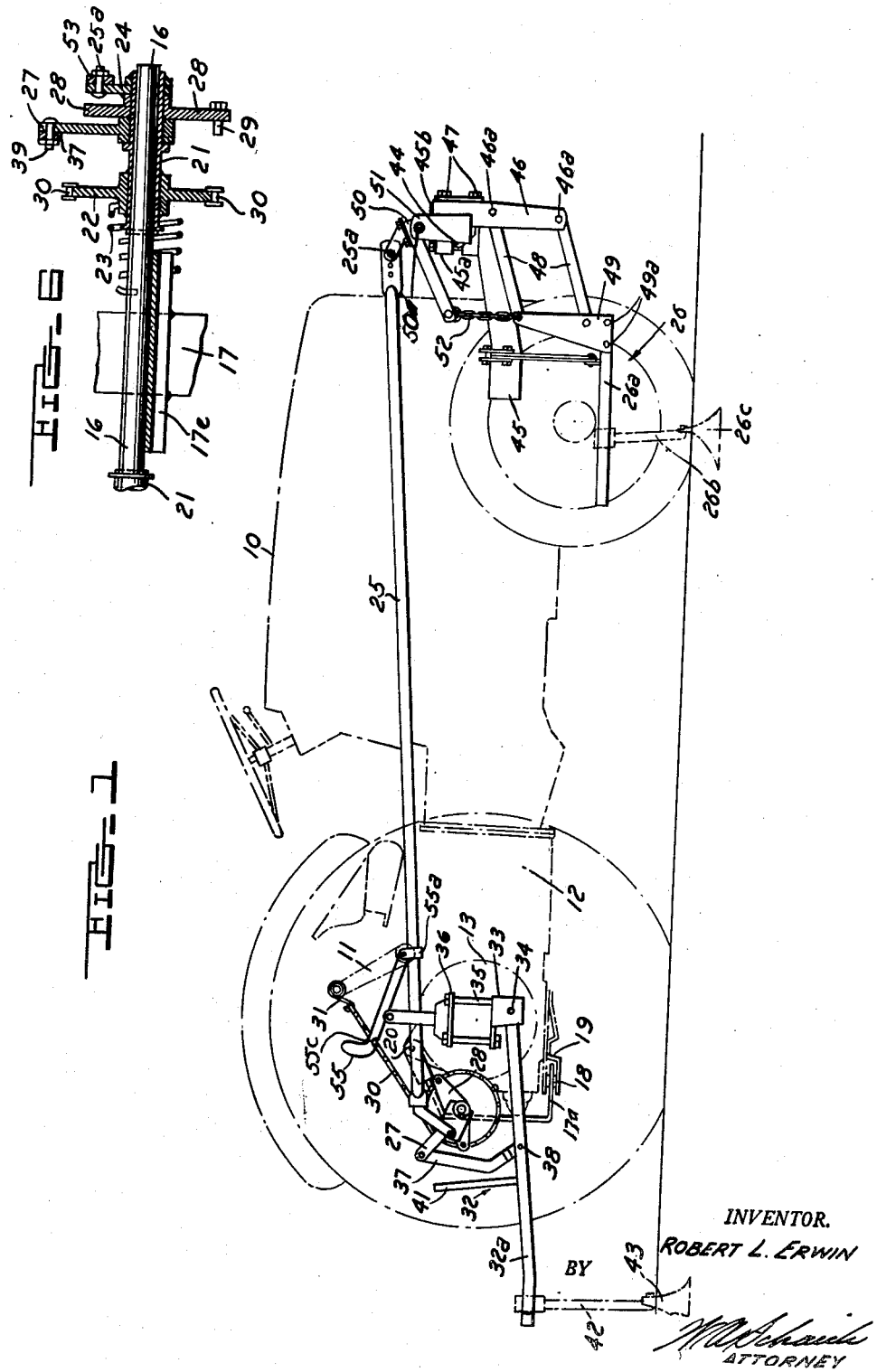

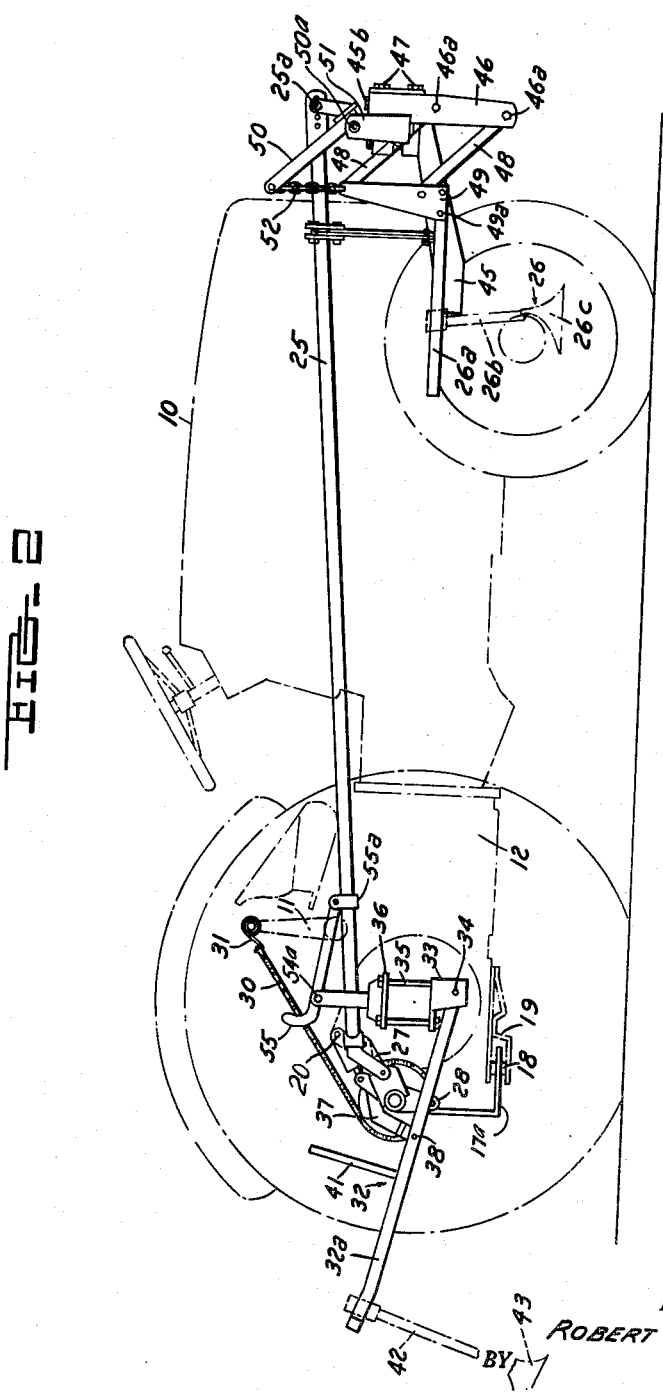

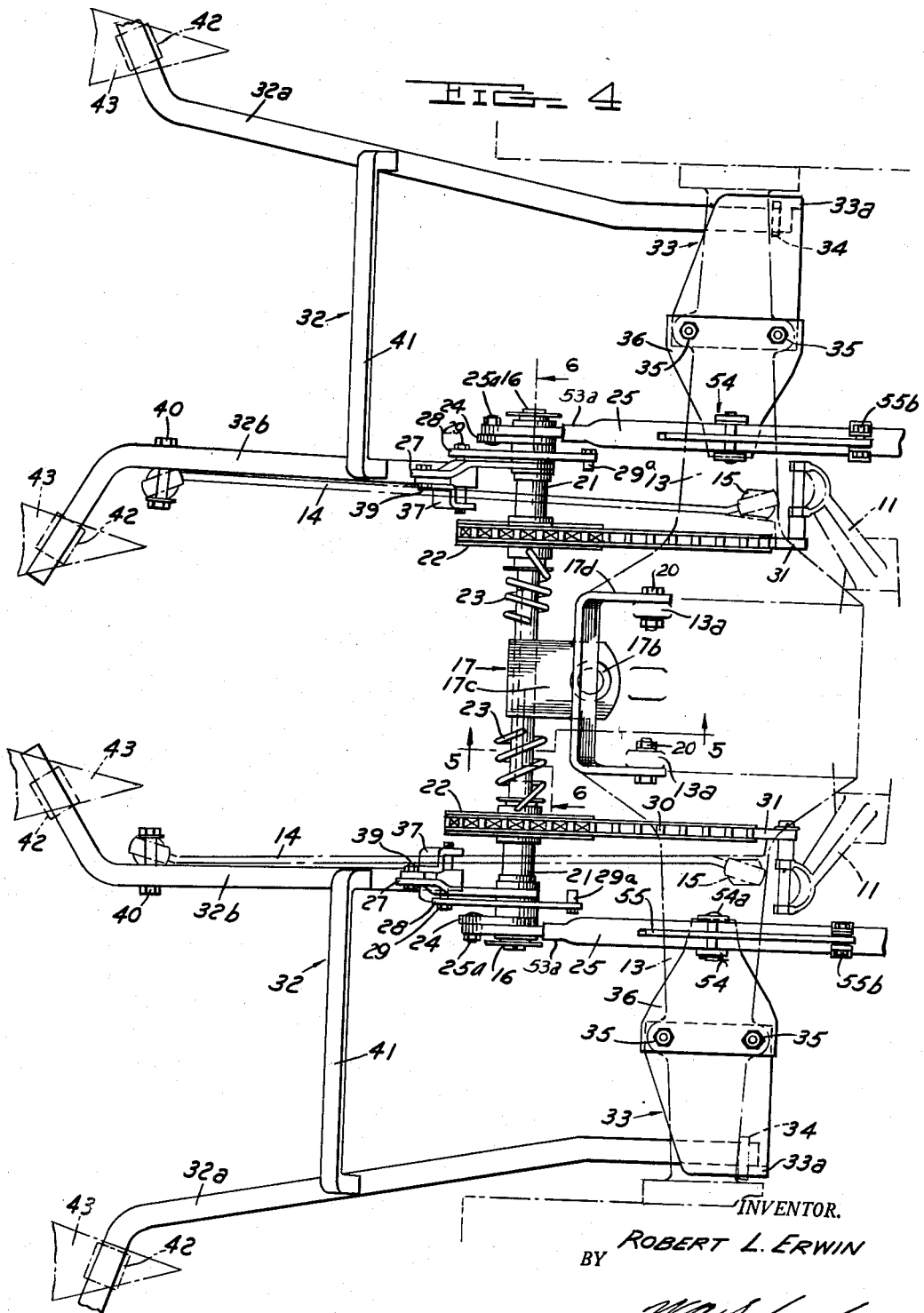

Patented Sept. 28, 1954

2,690,108

UNITED STATES PATENT OFFICE 2,690,108

DELAYED ACTION INDEPENDENT CULTIVATOR GANG LIFTING DEVICE

Robert L. Erwin, Royal Oak, Mich., assignor, by mesne assignments, to Ford Motor Company, Dearborn, Mich., a corporation of Delaware Application July 7, 1950, Serial No. 172,553

2 Claims. (Cl. 97—46.39)

This invention relates to a power operated mechanism for tractors for selective raising or lowering of front and rear tractor mounted cultivator gangs.

Tractor mounted cultivators conventionally incorporate a set of front and rear mounted gangs of tools on each side of the tractor. In cultivating row crops with tractor mounted cultivators, it is desirable to raise the front mounted cultivators out of engagement with the ground when the tractor approaches the end of a row. With the front mounted cultivators out of the ground, it is then desirable that the rear cultivators remain in the ground until the rear tractor wheels have reached the end of the row whereupon the rear cultivators should be raised out of the ground. Raising the cultivator gangs in this fashion not only avoids damage to the cultivator gangs or sweeps but leaves the field in a neatly cultivated condition to the extreme end of the rows. On entering a row the procedure is reversed, that is, the front cultivator gangs are lowered first and then the rear gangs lowered to ground working position.

Not only is it desirable to sequentially raise and lower the cultivator gangs as above mentioned, but when cultivating rows adjacent to fences or edges of the field it is generally desirable that the cultivator gangs on the side of the tractor adjacent the fences or field edge be raised out of contact with the ground. It may also be desirable at times to selectively operate any one of the various gangs independently of the others.

A mechanism to accomplish the above-mentioned ends should preferably be power operated to relieve the operator of all but a minimum of manual effort so that his attention may be devoted solely to the operation of the tractor.

Accordingly, it is an object of this invention to provide an improved power operated mechanism for selective lifting or lowering of the respective gangs of front and rear mounted cultivator gangs on a tractor.

Another object of this invention is to provide a power operated cultivator gang lifting mechanism for front and rear tractor mounted cultivator gangs which will not only permit the front gangs to be raised or lowered independently of the rear gang, but will also automatically accomplish the raising or lowering of the rear gangs subsequent to the raising or lowering of such front gangs in a predetermined timed relationship therewith.

A particular object of this invention is to provide a delayed action lifting mechanism for cultivator gangs or the like for use with a tractor having power operated lifting arms.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view of a tractor showing a lift mechanism constructed in accordance with this invention for controlling cultivator gangs mounted on such tractor with the gangs in the lowered working position.

Fig. 2 is a view similar to Fig. 1 but showing the cultivator gangs in a raised position.

Fig. 3 is an enlarged side elevational view of the rear portion of the tractor with one wheel removed to more clearly illustrate the arrangement of the elements of the improved lift mechanism of this invention.

Fig. 4 is a plan view of the device of Fig. 3.

Fig. 5 is a sectional view taken along the plane 5—5 of Fig. 4.

Fig. 6 is a sectional view taken along the plane 6—6 of Fig. 4.

As shown on the drawings:

This invention makes use of the power operated lift arms of a tractor of well-known make for actuation of the cultivator lifting mechanism. Briefly, this invention comprises a transverse shaft mounted on the differential housing of the tractor and rotatably supporting a sleeve on each end of such shaft. A sprocket is provided on each of the sleeves and such sprockets are respectively connected to the power operated tractor lift arms by a chain. Front and rear mounted cultivator gangs are respectively independently connected to suitable lifting levers mounted on the rotatable sleeves. The lifting levers of the front gangs are secured to the respective sleeves, while the lifting levers of the rear gangs are journaled on the sleeves. Hence the front gangs are immediately raised by upward movement of the tractor lift arms, but the rear gangs are not raised until a driving member fixed on each sleeve contacts the lifting levers of the rear mounted gangs to raise such gangs. An over-center linkage is provided to hold the rear gangs in elevated position while the front gangs are lowered. A locking device is provided to selectively lock the front mounted cultivator gangs or the front and rear cultivator gangs on either side in a raised position if desired.

In Figs. 1, 2 and 3 there is shown a tractor 10 of well-known make which has a hydraulically operated ram (not shown) for vertical lifting of a pair of transversely spaced lifting arms 11. Lifting arms 11 are controllable by a manually operated hydraulic control lever (not shown) on the tractor whereby such lift arms can be selectively raised or rotated to any desired height within the limits of the total movement of such lift arms. Lift arms 11 are respectively mounted on opposite sides of the differential housing 12 of the tractor just forwardly of the rear axle housing 13. A pair of rearwardly extending transversely spaced draft links 14 are pivotally connected to the axle housing 13 as at 15 (Fig. 4).

A transverse shaft 16 is mounted adjacent to, but rearwardly of axle housing 13 by a bracket 17. Bracket 17 comprises a strap member 17a bent into a substantially U-shaped configuration as best shown in Fig. 3. A vertical transverse aperture 17b is provided in the lowermost arm of bracket 17 as shown in Fig. 4 and a clevis pin 18, carried by a hitch bracket 19 secured to the underside of tractor housing 12 is insertable through hole 17b to mount the lower portion of bracket 17 on the hitch bracket 19. The upper arm of the U-shaped bracket 17 slopes upwardly somewhat as shown at 17c and a yoke 17d is welded to the end of such arm. Yoke 17d is secured to a pair of transversely spaced integral lugs 13a provided on top of axle housing 13 as shown in Fig. 4 by a pair of bolts 20. A transverse angle iron member 17e (Fig. 5) is secured by welding to the bight portion of bracket 17 as shown in Fig. 5 to support shaft 16. Shaft 16 is secured by welding to the transverse angle member 17e to prevent rotation of such shaft.

A pair of tubular sleeves 21 are respectively mounted on each end of shaft 16 and a pair of sprockets 22 are respectively rigidly secured on the inwardly disposed ends of each sleeve 21, as shown in Figs. 4 and 6. A pair of torsion springs 23 respectively surround the portions of shaft 16 projecting out of bracket 17 as shown in Figs. 4 and 5. One end of each of the springs 23 is secured within a suitable radial aperture provided in shaft 16 adjacent bracket 17. The other end of each spring 23 is secured within a suitable radial aperture provided in the hub of each sprocket 22. Springs 23 bias sleeves 21 in a counter-clockwise direction as viewed in Fig. 1.

An implement operating arm or lever 24 is welded near the outside end of each sleeve 21 as best shown in Figs. 3, 4 and 6, and a pair of longitudinally forwardly extending links 25 are respectively pivotally secured to levers 24 by bolts 25a. Lever 24 may be conveniently referred to as a rotatable master control element. Links 25 are provided for raising a pair of front mounted cultivator gangs 26 as will be later described.

A second implement operating arm 27 is rotatably mounted on each sleeve 21 as best shown in Figs. 4 and 6. Arms 27 are substantially longer than levers 24 and are provided for raising draft links 14 as will be presently described.

A driving member 28 (Fig. 6) is rigidly secured on each sleeve 21 intermediate the levers 24 and 27. Driving member 28 comprises essentially a substantially triangularly shaped plate member 28a having a cylindrical hub portion 28b on one face thereof adjacent an apex thereof. A transverse axial hole is provided in hub portion 28b by which the driving member is mounted on sleeve 21 and the driving member and sleeve are suitably keyed together. An abutment, here a transverse pin 29, is suitably secured in the rearmost apex of driving member 28 and a corresponding abutment pin 29a is secured in the foremost apex as shown in Figs. 3 and 4 for rotating lever 27 as will be later described.

Lift arms 11 are respectively connected to sprockets 22 by a pair of drive chains 30 which partially surround such sprockets. The ends of such chains are respectively secured to the upper ends of lift arms 11 by a link member 31, and to the sprockets 22 by a pin 31a. Hence the master control element is rotatably oscillated in accordance with the pivotal oscillations of lift arms 11.

A pair of rear cultivator gangs 32 are pivotally mounted on the tractor. Each cultivator gang 32 comprises a pair of substantially parallel, rearwardly extending beams 32a and 32b. Cultivator beams 32a are respectively pivotally mounted at their forward ends by a transverse pin 34 to a pair of transversely spaced brackets 33 depending from tractor axle housing 13 and such brackets comprise a plate member having a downwardly bent vertical portion 33a to which beams 32a are secured as above mentioned. Brackets 33 are secured underneath axle housing 13 by a pair of vertical fender bolts 35 and the same bolts are also utilized to secure a second bracket 36 to the top of such housing, as shown in Fig. 4.

Each set of cultivator beams 32a and 32b are reconnected by a transverse bar member 41 respectively welded at its ends to approximately the center of beam 32a and adjacent the forward end of beams 32b. The front end of each beam 32b is pivotally connected to a link member 37 by a transverse pin 38. The upper end of link 37 is connected to lever arm 27 by a transverse pin 39. Beams 32b are provided with a transverse bolt or mounting pin 40 near the rear ends thereof on which tractor draft links 14 are respectively mounted. Each beam 32a and 32b is provided with a depending tool standard 42 suitably mounted on the trailing end of each of such beams and an earth working tool, in this instance a cultivator sweep 43, is suitably secured to the lower end of each tool standard 42.

The pair of front mounted cultivator gangs 26 are carried on a tool bar 44 transversely supported across the front of tractor 10 by a pair of transversely spaced brackets 45 (Fig. 1), and such tool bar 44 is secured to each of the brackets 45 by a clamp member 45a and bolts 45b. A pair of transversely spaced depending arms 46 are respectively secured to the front ends of brackets 45 as shown in Figs. 1 and 2 by bolts 47. The cultivator gangs 26 are each pivotally mounted by a pair of parallel links 48 to the corresponding arm 46. Links 48 are respectively secured at their forward ends to depending arms 46 by bolts 46a and at their rear ends to an upstanding plate 49 which mounts the front cultivator beams 26a by bolts 49a as shown in Figs. 1 and 2. Cultivator beams 26a support depending tool standards 26b and on the bottom ends of such tool standards there are secured suitable cultivator sweeps 26c. A pair of bell cranks 50 are respectively mounted on a transverse shaft 50a rotatably supported by a pair of upstanding end brackets 51 respectively secured to the ends of tool bar 44. Bell cranks 50 are respectively connected to the upper ends of plates 49 by chains 52. The forward ends of operating links 25 are respectively pivotally connected to bell cranks 50 by a bolt 25a as best shown in Figs. 1 and 2. Further description of the front mounted cultivator gangs is not believed necessary as the details of such form no part of this invention.

The pair of operating links 25 are provided at their rear ends with a downwardly bent end portion 53. Such end portion is of flat stock and is rigidly secured to each tubular link 25 by a suitable fitting 53a as best shown in Fig. 3. The end portion 53 is pivotally secured to lever 24 by a transverse bolt 25a. A pair of upstanding transversely spaced strap members defining a post-like member 54 are secured as by welding to the top of bracket 36 as best shown in Figs. 3 and 4. A transverse pin 54a is secured within suitable transverse apertures provided near the top of each post 54 as shown in Figs. 3 and 4 for a purpose to be presently explained. A locking lever 55 is mounted on each tubular link 25 and is pivotally secured by a bolt 55b to a clamp 55a surrounding each of the links 25. A transverse notch 55c is provided on the underside of locking lever 55 which is engageable with transverse pin 54a to lock each link 25 in a raised position as will be later described.

Operation

The improved delayed action lifting mechanism of this invention enables the independently mounted front and rear cultivator gangs to be selectively raised or lowered as may be desired. Assuming that all of the cultivator gangs are in ground engaging relationship and the tractor is moving along in a forwardly direction, the rear cultivator beams 32a and 32b and the front beams 26a will then be in a substantially horizontal position as shown in Figs. 1 and 3. In such position the driving member 28 is positioned about as shown in Fig. 3 with pins 29 out of contact with levers 27. When it is desired to raise the front cultivator gangs 26, as at the end of a row, and then have the rear gangs 32 lifted from the ground a predetermined time after the front gangs are lifted, the tractor hydraulic control lever (not shown) is moved to effect raising of tractor lift arms 11. Such lift arms then rotate in a clockwise direction as shown in Fig. 3 whereupon chains 30 rotate sprockets 22. Sprockets 22 being non-rotatably secured to sleeves 21 will therefore rotate such sleeves in a clockwise direction, as shown in Fig. 3 whereupon stub levers 24 will be rotated in a corresponding direction to move operating links 25 forwardly.

Forward movement of links 25 will rotate bell crank 50 in a clockwise direction to raise the front cultivator gangs through the connection of chain link 52 with the upright plate 49 of cultivator gangs 26. Continued movement of lift arms 11 effects continued rotation of sleeves 21 after the lifting of the front cultivator gangs until pins 29 of driving member 28, which are rotating with sprockets 22, strike the underside of levers 27, thereby rotating such levers in a clockwise direction to raise rear cultivator beams 32a and 32b through the connection thereto by links 37. Lever arms 27 and links 37 are rotated to an "over center" position and in such position will in effect lock the rear gangs in a raised position until such lever arms are forced back "over center" as will be explained. Continued forward movement of levers 27 substantially beyond the "over center" position is prevented by links 37 striking sleeves 21. Thus the front and rear gangs are raised, with the rear gangs being raised subsequent to the lifting of the front gangs. The delay thus permitted by this improved lifting mechanism is proportioned to permit the tractor to pass to the end of the row before the rear gangs are lifted out of working engagement with the soil. The gangs may be locked in such raised position by engaging locking levers 55 with pins 54a.

Upon entering the field preparatory to cultivating a plurality of rows of crops, the front cultivator gangs 26 are lowered to working position by unlocking the locking levers 55 as shown in Fig. 1, at the same time lowering lifting arms 11 by the hydraulic control lever (not shown). Gravity will then lower the front mounted gangs into ground working position and tubular link 25 will simultaneously be moved rearwardly by the counter-clockwise rotation of bell crank 50 caused by the downward movement of front cultivator gangs 26. Lever 24 is, accordingly, rotated in a counter-clockwise direction as shown in Fig. 3 in response to the rearward movement of tubular link 25. The lowering movement of lift arms 11 controls the speed of downward rotation of levers 24. Rotation of lever 24 effects a corresponding rotation of sleeve 21 and hence driving member 28 is rotated in a corresponding direction. When the front cultivator gangs have nearly approached the ground, the pin 29a of driving member 28 strikes the forward edge of lever 27 to rotate such lever beyond the over center position whereupon the rear cultivator gangs 32 will drop to the ground by gravity at about the time the rear wheels have entered the row. Thus, an appreciable delay between the dropping of the front and rear mounted gangs is provided to permit the rear cultivator gangs to remain in a lifted position until the rear tractor wheels have entered the row in order to eliminate damage to the rear cultivator gangs and to neatly cultivate the field at the beginning of the row.

In the operation of the tractor it may be desired at some time or other to utilize only the rear gangs for cultivating purposes. In this instance the front cultivator gangs 26 are lifted as above described by raising lift arms 11 to rotate sprockets 22. Just prior to the pin 29 striking lever 27, the rotational movement of lever arms 11 may be arrested by the operator through the hydraulic control lever (not shown). In this partially raised position of the lift arms 11, the front mounted cultivator gangs 26 are out of the ground and since pin 29 is out of contact with lever 27 there has been no clockwise rotational movement of such lever, and hence the rear cultivator gangs 32 will remain in engagement with the soil.

Obviously to raise the rear gangs out of contact with the soil it is merely necessary to operate the tractor hydraulic control lever to permit lift arms 11 to rotate the remaining amount of movement left whereupon pin 29 will contact the underside of lever 27 to effect raising of rear gangs 32, whereupon locking lever 55 may be engaged with posts 54. When it is desired to lower the front and rear gangs, it is merely necessary to unlock levers 55 by rotating them in a clockwise direction as in Fig. 2 and to return the tractor hydraulic control lever to its other position (not shown) whereupon the pressured fluid will be bled out of the hydraulic lines (not shown) to permit lift arms 11 to return to the lowered position. Torsion springs 23 which were placed under considerable torsional bias during the clockwise movement of sprocket 22 now act to rotate such sprockets in a counter-clockwise direction (as viewed in Fig. 1) whereupon lever 24 withdraws or moves links 25 rearwardly thereby rotating bell crank 50 in a counter-clockwise direction to lower the front mounted gangs 26 to the ground. Driving members 28 being non-rotatably secured to sleeve 21 are also rotated in a counter-clockwise direction whereupon the forward pin 29a provided on such driving member contacts the upper surface of lever arm 27 to force such arm in a counter-clockwise direction beyond the "over center" position whereupon rear cultivator gangs 32 are lowered into working position by gravity.

As was mentioned above, the front mounted cultivator gangs can be positioned in a raised position with the rear gangs in a working position. There may be times, however, when it is desired to have only the right hand side front and rear gangs in ground engaging position, or the left hand side front and rear gangs in ground engaging position. When such is desired, it is merely necessary to raise all of the gangs as above described and then engage the locking lever 55 with the pin 54a corresponding to the selected side of gangs to be raised thus corresponding link 25 will be locked in the forward position. Both the front and rear gangs will, of course, also be raised out of contact with the ground levers 27 in an "over center" position. By permitting the tractor lift arms 11 to return to the lowered position, the cultivator gangs on the desired side will then be lowered as above described. The rear gang on the side of the tractor having the link 25 secured in the locked forward position cannot then be lowered because the end portion 53 of link 25 connected to lever 24 prevents rotation of sleeve 21 in any direction and inasmuch as driving member 28 is non-rotatably secured to such sleeve, such driving member therefore cannot rotate and lever 27 being in an "over center" position will maintain the corresponding rear gang in the raised position.

Any one of the gangs can be raised or lowered independently of the other by manipulation of the hydraulic control lever (not shown) and by selectively engaging locking member 55 with the corresponding locking pin 54a to accomplish this end, except, of course, that the front gang on either side must be raised prior to the rear gang on the same side From the above description it will appear to those skilled in the art that there is here provided a simple and unique design for delayed or selective lifting of rear mounted cultivator gangs on a tractor. Such mechanism utilizes the readily available power of the lift arms of a tractor of well known make, thereby providing a relatively simple, yet positively acting mechanism for raising the front and rear cultivator gangs mounted on the tractor. The selective and independent operation of the various gangs mounted on the tractor will be decidedly advantageous in performance of all types of cultivating.

It will, of course, be understood that various details of construction may be varied through a wide range without departing from the principles of this invention and it is, therefore, not the purpose to limit the patent granted hereon otherwise than necessitated by the scope of the appended claims.

I claim:
1. For use with a tractor having a power-lifted pivoted arm and a pair of ground working tools respectively pivotally attachable to spaced points on the tractor and movable vertically to and from a ground engaging position, the improvement comprising a master control member, means for journaling said master control member on the tractor for rotational oscillation, means connecting said master control member to the tractor power-lifted arm, a first link operatively interconnecting said master control member and one of said tools, thereby raising and lowering said one tool concurrently with rotational oscillations of said master control member, a lever, means for journaling said lever in coaxial relationship with said master control member to permit relative angular displacement of said master control member and said lever, a second link operatively interconnecting said lever and the other of said tools, whereby the angular position of said lever determines the vertical position of said other tool, a driving member rigidly secured to said master control member in a position axially adjacent to said lever, a first abutment on said driving member engageable with said lever after a predetermined rotation of said master control member in the direction to raise said one tool, whereby said lever is actuated to raise said other tool subsequent to raising of said one tool, said lever and said second link being constructed and arranged to assume an over-center locked position at the extreme tool raising position of said master control member, thereby retaining said other tool in its raised position, and a second abutment on said driving member angularly spaced from said first abutment and engageable with said lever after predetermined rotation of said master control member in the direction to lower said one tool to shift said lever out of over-center relationship with said second link, whereby said other tool is lowered subsequent to lowering of said one tool.

2. For use with a tractor having a power-lifted pivoted arm and a pair of ground working tools respectively pivotally attachable to spaced points on the tractor and movable vertically to and from a ground engaging position, the improvement comprising a master control member, means for journaling said master control member on the tractor for rotational oscillation, means connecting said master control member to the tractor power-lifted arm, a first link operatively interconnecting said master control member and one of said tools, thereby raising and lowering said one tool concurrently with rotational oscillations of said master control member, said master control members having a cylindrical element coaxially secured thereto, a lever journaled on said cylindrical element, a second link operatively interconnecting said lever and the other of said tools, whereby the angular position of said lever determines the vertical position of said other tool, a driving member rigidly secured to said master control member in a position axially adjacent to said lever, a first abutment on said driving member engageable with said lever after a predetermined rotation of said master control member in the direction to raise said one tool, whereby said lever is actuated to raise said other tool subsequent to raising of said one tool, said lever and said second link being constructed and arranged to assume an over-center locked position at the extreme tool raising position of said master control member, thereby retaining said other tool in its raised position, and a second abutment on said driving member angularly spaced from said first abutment and engageable with said lever after predetermined rotation of said master control member in the direction to lower said one tool to shift said lever out of over-center relationship with said second link, whereby said other tool is lowered subsequent to lowering of said one tool.

References Cited in the file of this patent

UNITED STATES PATENTS

| Number | Name | Date |
|---|---|---|
| 1,911,306 | Cady | May 30, 1933 |
| 2,164,224 | Smith | June 27, 1939 |
| 2,180,124 | Smith | Nov. 14, 1939 |
| 2,181,917 | Schaapveld | Dec. 5, 1939 |
| 2,200,768 | Benjamin et al. | May 14, 1940 |
| 2,309,158 | Benjamin | Jan. 26, 1943 |
| 2,336,062 | Brown et al. | Dec. 7, 1943 |
| 2,368,156 | Orelind et al. | Jan. 30, 1945 |
| 2,569,389 | Seaholm | Sept. 25, 1951 |
| 2,576,780 | Court | Nov. 27, 1951 |